US010687189B2

(12) United States Patent
Breton

(10) Patent No.: US 10,687,189 B2
(45) Date of Patent: Jun. 16, 2020

(54) EMERGENCY VEHICLE LOCATOR

(71) Applicant: Maxwell Joseph Breton, Washington, DC (US)

(72) Inventor: Maxwell Joseph Breton, Washington, DC (US)

(*) Notice: Subject to any disclaimer, the term of this patent is extended or adjusted under 35 U.S.C. 154(b) by 0 days.

(21) Appl. No.: 15/462,908

(22) Filed: Mar. 19, 2017

(65) Prior Publication Data
US 2017/0270792 A1 Sep. 21, 2017

Related U.S. Application Data

(60) Provisional application No. 62/310,792, filed on Mar. 20, 2016.

(51) Int. Cl.
G08G 1/00 (2006.01)
H04W 4/80 (2018.01)
G01C 21/36 (2006.01)
H04W 4/46 (2018.01)
H04W 4/029 (2018.01)
G08G 1/0965 (2006.01)
G01S 19/17 (2010.01)
G01S 5/00 (2006.01)
G01S 19/14 (2010.01)
H04W 4/02 (2018.01)

(52) U.S. Cl.
CPC .......... *H04W 4/80* (2018.02); *G01C 21/3667* (2013.01); *G01C 21/3697* (2013.01); *G01S 5/0072* (2013.01); *G01S 19/14* (2013.01); *G01S 19/17* (2013.01); *G08G 1/0965* (2013.01); *G08G 1/20* (2013.01); *H04W 4/029* (2018.02); *H04W 4/46* (2018.02); *H04W 4/026* (2013.01)

(58) Field of Classification Search
CPC ................ G08G 1/137; G01C 21/3626; G01C 21/3667; H04W 4/046; H04W 4/008; G01S 19/13
USPC ......................................................... 340/902
See application file for complete search history.

(56) References Cited

U.S. PATENT DOCUMENTS

2012/0313792 A1* 12/2012 Behm .................. G08G 1/0965
340/902

* cited by examiner

Primary Examiner — Tanmay K Shah

(57) ABSTRACT

A low-cost system for simultaneously displaying the locations of all nearby emergency vehicles onto the same moving map as the current location of another vehicle is described. Each emergency vehicle receives location data from a OPS receiver and broadcasts the location data using a Bluetooth or other transmitter directly to associated receivers in other vehicles. Other vehicles receive location data corresponding to their own locations using their own OPS receivers and each displays their own location onto their own moving map display in the usual manner. Additionally, the other vehicles also have Bluetooth or other receivers which directly receive the local broadcasts containing emergency vehicle locations and display the locations of all emergency vehicles simultaneously with their own location. The operator of the vehicle benefits by knowing the relative locations of the emergency vehicles when they cannot be seen. Some emergency vehicle operators may optionally choose to not broadcast their location data under certain circumstances.

12 Claims, 2 Drawing Sheets

EMERGENCY VEHICLE LOCATOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to displaying the location of nearby emergency vehicles on GPS map displays in vehicles to improve the situational awareness of drivers.

Drivers of vehicles often hear emergency vehicles but cannot determine their locations in relation to their own vehicle. Therefore drivers cannot immediately determine the best course of action for avoiding the path of approaching emergency vehicles. This cm create a delay or safety hazard for both vehicles and for drivers and passengers of nearby vehicles. Resulting confusion and uncertainty also leads to less efficient traffic flow when emergency vehicles are heard by a driver but not yet seen by the driver.

Most drivers already have access to their physical location based on OPS technology. Drivers of vehicles with built-in OPS receivers and drivers with mobile phone or other mobile based OPS receivers can see the locations of their vehicles on their moving map displays but they cannot see the locations of emergency vehicles on the same display, even when their presence is known because of their audible sirens and flashing lights. Behm (patent application US 2012/0313792 and subsequent patent U.S. Pat. No. 8,842, 021) addresses the aforementioned problems with a complicated system that requires two-way communication to be established between an emergency vehicle and a separate Location Based Service (LBS) component and the establishment of two-way communication between the LBS and another vehicle, for indirectly handling comminations between the vehicles. Furthermore, such an LBS-based system would require a $3^{rd}$ party service organization to set up and maintain the structure which would likely lead to additional operational costs that would get passed on to users.

What is needed to improve traffic flow and safety is a low cost, direct emergency vehicle-to-vehicle system and method to simultaneously display the locations of emergency vehicles onto the same moving map display that shows the location of their vehicle. More specifically, there is a need for a simplified, low-cost moving map display device showing the location of the driver's vehicle and the relative locations of emergency vehicles operating nearby. The existence of such a system would improve safety and traffic flow efficiency.

BRIEF SUMMARY OF THE INVENTION

A low-cost, OPS-based system and method for simultaneously displaying the location of one's vehicle and nearby emergency vehicles on a moving map display is described herein. This system is designed to be low enough in cost and highly reliable, making it deployable in large numbers in vehicles.

In one embodiment an emergency vehicle is equipped with a GPS receiver for determining the emergency vehicle's current location, a Bluetooth transmitting beacon for optionally broadcasting the emergency vehicle's location wherein the optional broadcast contain the current location data received from the emergency vehicle's OPS receiver after a communications means transfers the emergency vehicle's location data from the OPS receiver to the Bluetooth beacon. The GPS receiver, comminations mans, and Bluetooth beacon could all be housed in a single device or could be located in separate, connected devices.

Another vehicle is equipped with a OPS receiver for determining the vehicle's current location, a Bluetooth receiver for receiving broadcasts from Bluetooth beacons of nearby emergency vehicles containing the location information for those vehicles, a moving map display and a communications means for communicating the location information from both the OPS receiver and the received Bluetooth broadcasts from emergency vehicles for display of all vehicles on the same moving map. The GPS receiver, Bluetooth receiver, moving map display, and communications means could all be housed in a single device or could be located in separate, connected devices.

In another embodiment, a smartphone or smartwatch is equipped with a OPS receiver fin determining one's stream location, a Bluetooth receiver for receiving broadcasts for nearby emergency vehicles containing the location information for those vehicles, a moving map display and communications means for communicating the location information from both the OPS receiver and the Bluetooth broadcasts for display of both on a moving map.

Another embodiment is an asset tracking system for monitoring the locations of assets or fleet vehicles. A cellular phone network, satellite communications system, or other long range communications means is used in place of the shorter range Bluetooth transmitter/receiver of the emergency vehicle embodiments.

Other embodiments are contemplated in which the specific hardware configurations am chosen based on the specific application requirements and cost considerations.

DETAILED DESCRIPTION OF THE INVENTION

Figure 1:
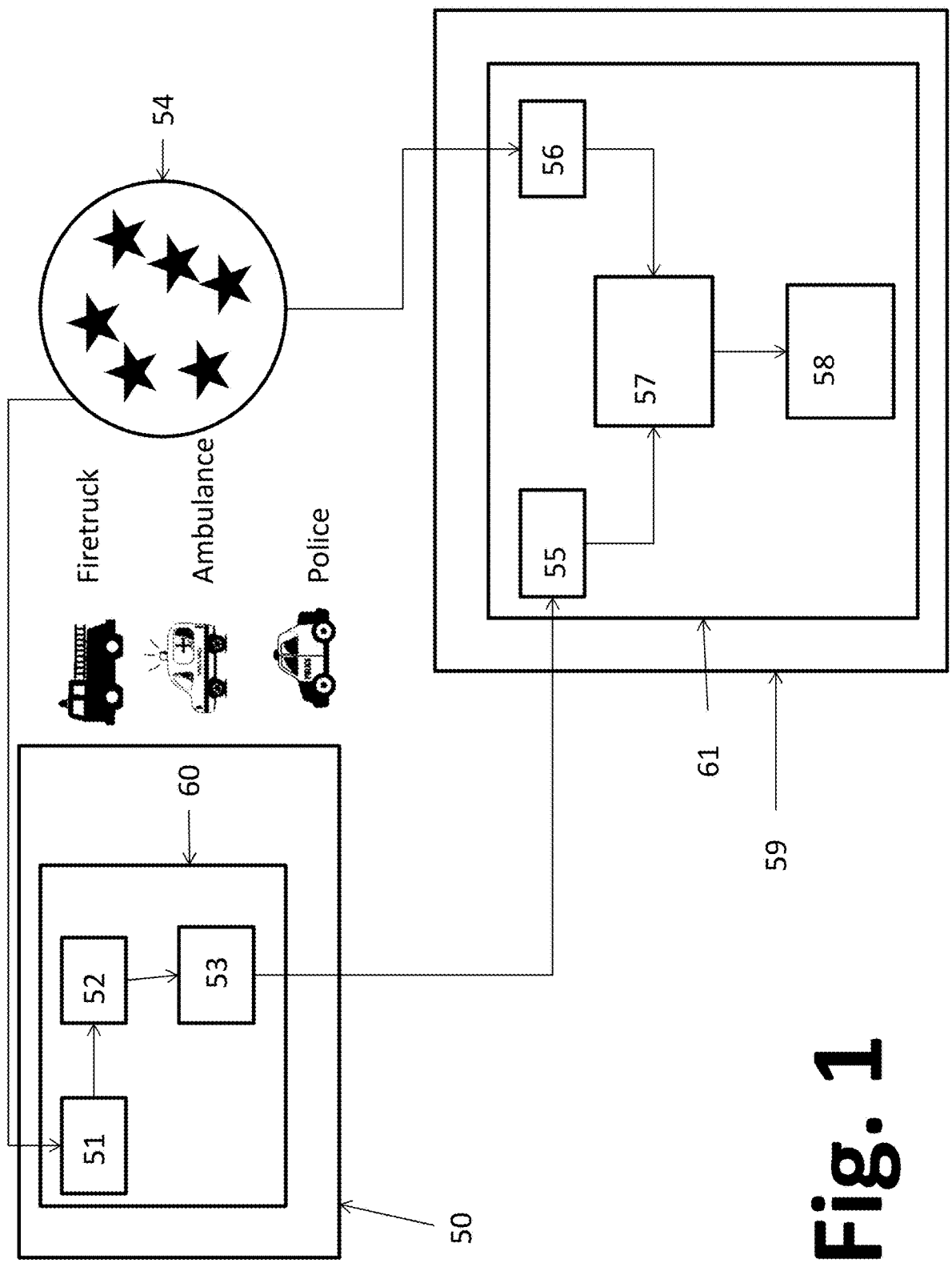
FIG. 1 show a system for broadcasting the GPS based location data of an emergency vehicle to Bluetooth receivers within the associated Bluetooth receiving range.

An exemplary embodiment of the invention is shown in FIG. 1. An emergency vehicle 5, e.g. a fire truck, an ambulance, or a police car has an on-board Location Broadcasting Information System (LBIS) 68 comprised of a Global Positioning System (OPS) receiver 51, a Bluetooth beacon 53, and a communication means 52. The OPS receiver 51 receives broadcasts from the OPS constellation 54 satellites in the normal manner for this well-known technology and determines the goo-location of the host emergency vehicle 50.

The communication means 2 transfers the location data from the GPS receiver 51 to the Bluetooth beacon 53. The Bluetooth beacon 53 broadcasts a radio signal containing identifying information about the type of its host emergency vehicle, e.g. fire truck, ambulance, or police car, and the location data from the OPS receiver 51 throughout the local geographic area.

An arbitrary vehicle 59 employs a Dual Location Receiving and Display System (DLRDS) 61. The DLRDS 61 is comprised of a second GPS receiver 56, a Bluetooth receiver 55, a second communication means ST, and a moving map display SS. The second OPS receiver 56 receives broadcasts from the OPS constellation 54 satellites in the normal manner for this well-known technology and determines the geo-location of the host vehicle 59. The Bluetooth receiver 55 receives broadcasts from all Bluetooth beacons installed on emergency vehicles in the local area, e.g. the Bluetooth beacon 53 on the emergency vehicle 50. Because the range of said Bluetooth beacon 53 is limited, the beacon can only be received by vehicle(s) 59 in the local area of the emergency vehicle 50. This inherent nature of Bluetooth radio communications serves to prevent clutter that would otherwise be created by the reception of the locations of large numbers of emergency vehicles outside of the local area of the vehicle 59.

As stated above, said Bluetooth beacon 53 broadcast contains information about the type of emergency vehicle as well as the location of the emergency vehicle 50. The second communication means 57 communicates all received emergency vehicle typo and location information for emergency vehicles in the local area and the host vehicle 59 location obtained from the GPS receiver 56 to the moving map display 58.

Figure 2:
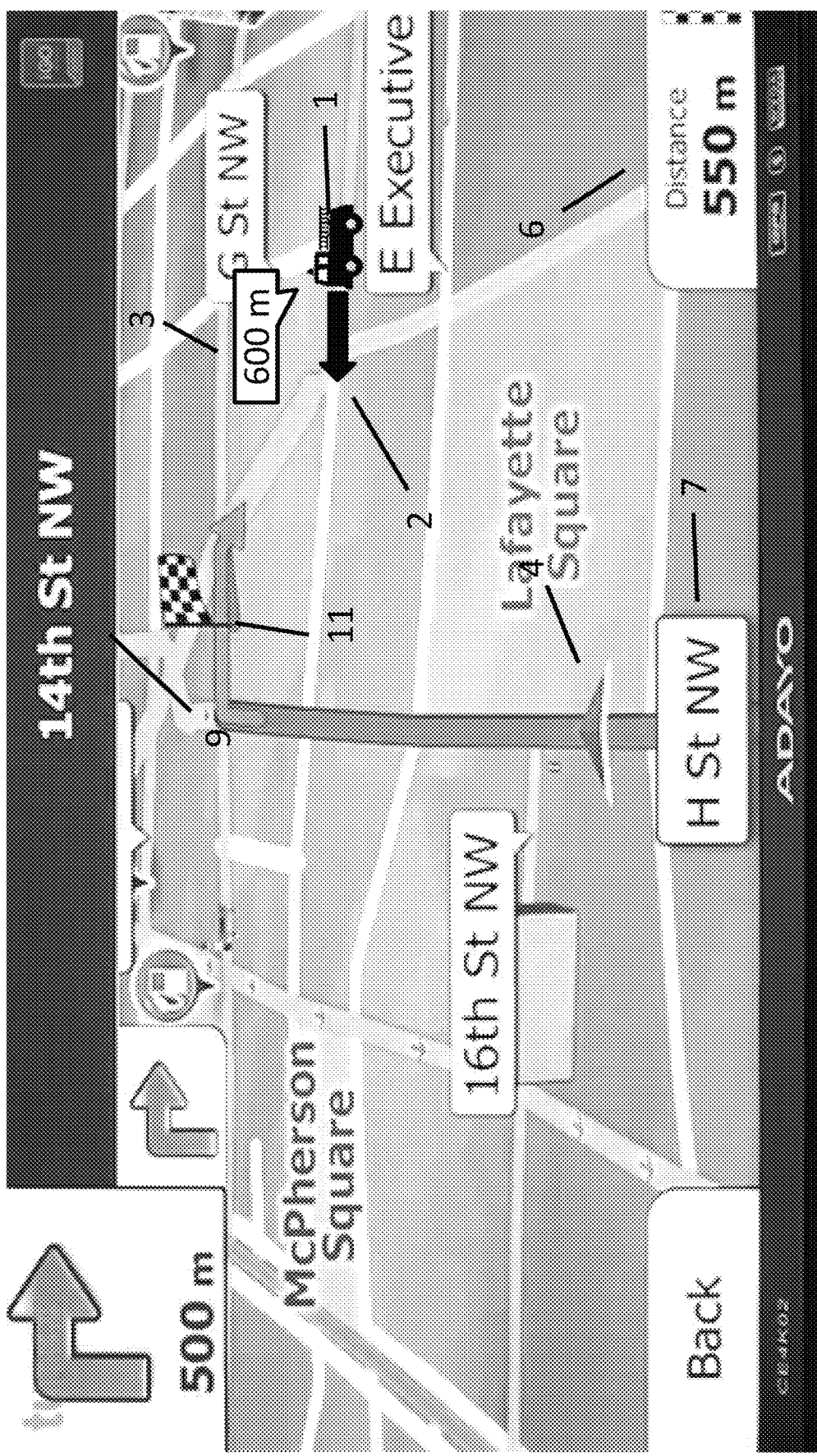
FIG. 2 is an illustrative example showing the simultaneous display of a vehicle's current location along with the location of a nearby emergency vehicle on the same moving map display used for vehicle navigation.

Referring to FIG. 2, the moving map display 58 simultaneously displays the location and type of the emergency vehicle 50 (FIG. 1) and location and types of any other emergency vehicles in the local area that are broadcasting their locations as well as the vehicle location indicator 4 associated with the host vehicle 59 (FIG. 1). FIG. 2 shows that in this exemplary embodiment, the vehicle 59 with an associated vehicle location indicator 4 is traveling on H Street as indicated by the current street indicator 7, it is 550 meters from its destination 11 as shown by the distance to destination indicator 6, and that an emergency vehicle 50 is located ha front and to the right of the vehicle 59 at about its 1:30 o'clock position. Furthermore, the emergency vehicle 50, indicated on the moving map by the fir truck emergency vehicle location indicator 1, is 600 m in distance from the vehicle 59, as shown by the emergency vehicle distance indicator 3. The emergency vehicle 50 is moving in the direction shown on the moving map by the direction of emergency vehicle indicator 2.

The present invention may be embodied in other specific forms without departing from the spirit or essential characteristics thereof. The embodiments described are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A vehicle to vehicle location system comprising:
   a first global positioning receiver for determining a location of a first vehicle;
   a radio frequency transmitter for broadcasting data;
   a first data communications interface for communicating data from the first global positioning receiver to the radio frequency transmitter;
   a second global positioning receiver for determining a location of a second vehicle;
   a radio frequency receiver for receiving broadcasted data;
   a moving map display for displaying a map and the locations the second vehicle and the locations of nearby vehicles;
   a second communications interface for communicating data from the radio frequency receiver and the second global positioning receiver to the moving map display, wherein:
   the first global positioning receiver, the first data communication interface, and the radio frequency transmitter are mounted on the first vehicle;
   the first data communications interface communicates first vehicle location data from the first global positioning receiver to the radio frequency transmitter;
   the radio frequency transmitter broadcasts the first vehicle location data;
   the second global positioning receiver, the second communications interface, the radio frequency receiver, and the moving map display are mounted on the second vehicle;
   the radio frequency receiver receives the first vehicle location data;
   the second communications interface communicates the first vehicle location data and the location of the second vehicle to the moving map display;
   the moving map display displays the first vehicle location relative to the second vehicle location.

2. An emergency vehicle to vehicle location system according to claim 1, wherein the first vehicle is an emergency vehicle.

3. A vehicle to vehicle location system according to claim 1, wherein the radio frequency transmitter transmits data corresponding to at least one additional parameter from a set of parameters characterizing the first vehicle and its travel route and the moving map display is capable of displaying the at least one additional parameter.

4. A vehicle to vehicle location system according to claim 3, wherein the at least one additional parameter is the type of vehicle and the moving map additionally displays the type of vehicle.

5. A vehicle to vehicle location system according to claim 1, wherein the radio frequency transmitter is a Bluetooth transmitter and the radio frequency receiver is a Bluetooth receiver.

6. A vehicle to vehicle location system according to claim 5, wherein the receiver comprises a cellular phone.

7. A vehicle to vehicle location system according to claim 4, wherein the radio frequency transmitter is a Bluetooth transmitter and the radio frequency receiver is a Bluetooth receiver.

8. A vehicle to vehicle location system according to claim 5, wherein the radio frequency receiver is installed on smart phone.

9. A vehicle to vehicle location system according to claim 5, wherein the second global positioning system is installed on a smart phone.

10. A vehicle to vehicle location system according to claim 6, wherein the second global positioning system is a portable system.

11. A method employing vehicle to vehicle communications for displaying the location of a first vehicle on a moving map display installed on a second vehicle, wherein:
- A first vehicle location coordinates are acquired by a first vehicle onboard global positioning system;
- The first vehicle location coordinates are communicated to an on-board radio frequency transmitter;
- The radio frequency transmitter broadcasts the first vehicle location coordinates;
- A radio frequency receiver onboard a second vehicle receives the first vehicle location coordinates;
- The second vehicle location coordinates are acquired by a second vehicle onboard global positioning system;
- The first vehicle location coordinates and the second vehicle location coordinates are communicated to a second vehicle moving map display;
- The first vehicle location and the second vehicle location are simultaneously displayed on the moving map display.

12. A method employing emergency vehicle to vehicle communications for displaying the location of an emergency vehicle on a moving map display installed on a second vehicle, comprising:
- The method according to claim 11, wherein the first vehicle is an emergency vehicle.

\* \* \* \* \*